(12) United States Patent
Rowen

(10) Patent No.: US 9,028,633 B1
(45) Date of Patent: May 12, 2015

(54) FIRE AND SMOKE SUPPRESSING SURFACE FOR SUBSTRATES

(75) Inventor: John B. Rowen, Southborough, MA (US)

(73) Assignee: Avtec Industries, Inc., Hudson, MA (US)

( * ) Notice: Subject to any disclaimer, the term of this patent is extended or adjusted under 35 U.S.C. 154(b) by 903 days.

(21) Appl. No.: 12/033,529

(22) Filed: Feb. 19, 2008

Related U.S. Application Data

(63) Continuation-in-part of application No. 11/324,519, filed on Dec. 30, 2005, now abandoned, which is a continuation-in-part of application No. 10/609,239, filed on Jun. 27, 2003, now abandoned.

(60) Provisional application No. 60/890,395, filed on Feb. 16, 2007.

(51) Int. Cl.
*B29C 63/02* (2006.01)
*B29C 63/00* (2006.01)

(52) U.S. Cl.
CPC .............. *B29C 63/02* (2013.01); *B29C 63/0017* (2013.01)

(58) Field of Classification Search
CPC .............. B29C 63/02; B29C 63/0017; B29K 2105/0026
USPC .................................................. 156/60, 166
See application file for complete search history.

(56) References Cited

U.S. PATENT DOCUMENTS

| | | | |
|---|---|---|---|
| 2,600,455 A | 6/1952 | Wilson et al. | |
| 3,293,327 A | 12/1966 | Hechenbleikner et al. | |
| 3,513,114 A | 5/1970 | Hahn et al. | |
| 3,562,197 A | 2/1971 | Sears et al. | |
| 3,654,190 A | 4/1972 | Levin | |

(Continued)

FOREIGN PATENT DOCUMENTS

DE 4109904 A1 * 10/1992
JP 2-8278 A * 1/1990

OTHER PUBLICATIONS

Rowan, John, "FR Veil Provides Low Cost Model to Achieve ASTM E-84 Class A Smoke Index" American Composites Manufacturers Association Conference, Oct. 2003.*

(Continued)

*Primary Examiner* — Jeff Aftergut
(74) *Attorney, Agent, or Firm* — Philip D. Askenazy; Peacock Myers, P.C.

(57) ABSTRACT

This invention relates generally to fabrics, films, sheets and other supporting media that contain and transport fire retarding materials. These transport media deliver fire retarding and smoke suppressing constituents to the surface of fiber reinforced polymer (FRP) composite substrates during a manufacturing process. Upon exposure to open flame or radiant heat, the resultant manufactured product has much lower surface flammability and smoke development characteristics than would otherwise be achieved by the substrate material alone. By economizing the fire retardant constituents at the surface only, cost is reduced while also avoiding deleterious adulteration of the substrate material. When fire is prevented from penetrating the surface, combustion of the entire part is delayed or prevented. By embedding fire retardant within the surface using the native resin, no peeling or chipping occurs (as with paint), and the finish will be essentially as hard and durable as an untreated part.

7 Claims, 14 Drawing Sheets

(56) References Cited

U.S. PATENT DOCUMENTS

| | | | |
|---|---|---|---|
| 3,875,971 A | 4/1975 | Hamling | |
| 3,914,193 A | 10/1975 | Fessler et al. | |
| 3,969,291 A | 7/1976 | Fukuba et al. | |
| 4,009,137 A | 2/1977 | Dany et al. | |
| 4,166,743 A | 9/1979 | Wortmann et al. | |
| 4,247,435 A | 1/1981 | Kasten | |
| 4,468,495 A * | 8/1984 | Pearson | 525/158 |
| 4,743,625 A | 5/1988 | Vajs et al. | |
| 4,801,625 A | 1/1989 | Parr et al. | |
| 4,818,595 A | 4/1989 | Ellis | |
| 5,055,242 A * | 10/1991 | Vane | 264/463 |
| 5,102,726 A | 4/1992 | Gabbay | |
| 5,167,876 A * | 12/1992 | Lem et al. | 252/602 |
| 5,225,464 A | 7/1993 | Hill, Jr. | |
| 5,236,773 A | 8/1993 | Sorathia et al. | |
| 5,356,568 A | 10/1994 | Levine | |
| 5,400,830 A | 3/1995 | Stiles et al. | |
| 5,401,793 A | 3/1995 | Kobayashi et al. | |
| 5,534,337 A * | 7/1996 | Bailey, Jr. | 428/301.4 |
| 5,618,865 A | 4/1997 | Matens et al. | |
| 5,749,948 A | 5/1998 | Scholz et al. | |
| 5,932,665 A | 8/1999 | DePorter et al. | |
| 5,942,330 A | 8/1999 | Kelley | |
| 5,989,706 A | 11/1999 | McGinniss et al. | |
| 6,001,437 A | 12/1999 | Thorpe et al. | |
| 6,031,040 A | 2/2000 | Horacek | |
| 6,054,513 A | 4/2000 | Pirig et al. | |
| 6,084,008 A | 7/2000 | Liu | |
| 6,096,812 A | 8/2000 | Hanafin et al. | |
| 6,153,674 A | 11/2000 | Landin | |
| 6,205,728 B1 | 3/2001 | Sutelan | |
| 6,228,914 B1 | 5/2001 | Ford et al. | |
| 6,331,350 B1 | 12/2001 | Taylor et al. | |
| 6,338,366 B1 | 1/2002 | Williams | |
| 6,340,645 B1 | 1/2002 | Horacek et al. | |
| 6,441,122 B1 | 8/2002 | DeMott et al. | |
| 6,818,248 B1 * | 11/2004 | Grace | 427/208.2 |
| 6,930,138 B2 | 8/2005 | Schell et al. | |
| 7,018,571 B1 | 3/2006 | Camarota et al. | |
| 7,045,080 B1 | 5/2006 | Youngs | |
| 2001/0027226 A1 | 10/2001 | Thewes et al. | |
| 2001/0045684 A1 * | 11/2001 | Blanchon | 264/163 |
| 2002/0136862 A1 * | 9/2002 | Dong et al. | 428/150 |
| 2002/0168503 A1 | 11/2002 | Dong et al. | |
| 2004/0054035 A1 | 3/2004 | Hallissy et al. | |
| 2004/0110870 A1 | 6/2004 | Liu | |
| 2004/0226100 A1 | 11/2004 | Small, Jr. et al. | |
| 2004/0266294 A1 | 12/2004 | Rowen | |
| 2005/0009965 A1 | 1/2005 | Schell et al. | |
| 2005/0009966 A1 | 1/2005 | Rowen | |
| 2005/0288421 A1 | 12/2005 | Burns et al. | |
| 2007/0284120 A1 | 12/2007 | Rowen | |

OTHER PUBLICATIONS

Caballero, James et al., "Smoke Suppressants", *Modern Plastics Encyclopedia* vol. 63, No. 10A, McGraw-Hill, Inc. 1986-1987, 179-180.

Rowen, John B. et al., "Composite Flame Retardant and Smoke Suppressing Surfacing Mat", www.hollinee.com/documents/FR%20Data/ 2003.

\* cited by examiner

FIRE AND SMOKE SUPPRESSING SURFACE FOR SUBSTRATES

CROSS-REFERENCE TO RELATED APPLICATIONS

This application claims the benefit of the filing of U.S. Provisional Patent Application Ser. No. 60/890,395, entitled "Fire and Smoke Suppressing Surface for Substrates", filed on Feb. 16, 2007. This application is also a continuation-in-part application of U.S. patent application Ser. No. 11/324,519, entitled "Fire and Smoke Suppressing Surface for Substrates", filed on Dec. 30, 2005, which application is a continuation-in-part application of U.S. patent application Ser. No. 10/609,239, entitled "Reinforced Flame-Retardant and Smoke-suppressive Fabrics, filed on Jun. 27, 2003. The specifications and claims thereof are incorporated herein by reference.

BACKGROUND OF THE INVENTION

1. Field of the Invention (Technical Field)

This invention relates generally to raw material fire retardant constituents transported to a secondary manufacturing process in media, and more particularly to fire retarding surfacing media, including but not limited to fabrics, films and sheets, intended for consumption in the creation of fiber reinforced polymer (FRP) composites.

2. Description of Related Art

Note that the following discussion refers to a number of publications by authors and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Typically, thermoset and thermoplastic resins are petroleum by-products that have generally undesirable burning characteristics, i.e., high flammability at relatively low temperatures, very toxic and acrid smoke, and rapid destructive flame spread. It is well known that the flammability of thermoset and thermoplastic resins can be reduced by incorporating flame retardant agents. However, when additives are used to fill these resins, a multitude of problems arise.

Synthetic polymer resins are frequently used in the manufacture of reinforced plastics, fiberglass laminates, and molded plastics. Composite polymer materials are widely used in such industrial applications as structural components, siding and roof panels, roof decking, cable trays and mechanical parts such as threaded rod and strut due to their corrosion resistance. Both thermoplastics and thermosetting plastics are also widely used by automobile, rail transportation and aircraft manufacturers because of their light weight and high strength.

The burning behavior of such materials, particularly those that are to be used in an enclosed environment, are of primary concern to the present invention. Many reinforced plastics can be designed to have a degree of fire resistance. Many fire retardant additives are available. Unfortunately, a large number of the prior art fire retardant compounds give off extremely toxic fumes, such as nitrous oxides, cyanide compounds, and a variety of toxic brominated compounds, such as hydrobromic acid (HBr), which causes pulmonary edema at relatively low concentrations.

Less toxic additives, such as aluminum trihydroxide (ATH), are inefficient and require loading levels that are so high that the desirable physical properties and characteristics of the finished product are dramatically diminished.

Those conventional polymeric additives have numerous problems associated with their use in a variety of ways. For example, during fabrication of a product, a thermoset polymer resin must have a sufficiently low viscosity to soak or "wet-out" the glass reinforcements prior to curing. This wet-out is necessary to achieve a high cross-link density within the finished product. However, when a fire retardant powder additive such as ATH is mixed into the resin in the necessary quantities for acceptable fire retardancy, e.g., perhaps as much as 60 parts in 100 parts of total mix, the resin viscosity increases dramatically as the styrenated resin wets-out the additive. As a result higher viscosity resin no longer has the ability to fully saturate the glass reinforcements.

To overcome this higher viscosity processing problem, virgin styrene is typically added to the mixed composition to lower the viscosity back to the required working viscosity range. Consequently, the resin contains a disproportionate, higher quantity of styrene. When the part has been processed and cured, the part contains a disproportionate quantity of cross-linked styrene and polystyrene. The heavily filled part has undesirable physical characteristics such as reduced tensile, flexural and shear strength. The only way to make up for the reduced physical strength characteristics is to produce a thicker, heavier, more expensive part.

Although the excessively high ATH fire retardant loading does reduce the likelihood of the part to combust, when exposed to an open flame or high radiant heat, the ATH inefficiently reduces combustion by liberating bound water. As the decomposition of the ATH complex continues, the additional styrene constituent makes a major contribution as a combustible fuel source, and provides the composite surface with a greater affinity towards flammability.

In addition, virgin and cured styrene is an egregious smoke generating compound, which significantly adds to overall smoke production of the part. Therefore, with ATH, there are processing problems which yield weaker parts, and which have the characteristic of generating larger quantities of toxic smoke.

To reduce the fire retardant loading in a thermoset resin, an alternative to ATH is a combination of decabromodiphenyl ether (DBPE) with antimony trioxide (ATO), e.g., less than 20 parts per 100 parts of total mix. However, an additional quantity of styrene is still necessary to reduce the buildup in viscosity.

When compared with ATH during a fire insult scenario, the brominated fire retardant package is more efficient at reducing flammability of the substrate than ATH. However, the brominated constituent package produces large quantities of dense, acrid smoke which is extremely toxic.

Bromine works as a fire retardant in a pyrolysing composite part by competing with oxygen in the ionization phase of the combustion reaction by generating large quantities of brominated acidic vapor, soot and acrid, thick particulate smoke. The formation of these compounds further reduces the availability of oxygen at the laminate surface, and the negative contributions due to the required styrene diluent are still present.

Although effective as a flame retardant, the smoke generated by brominated compounds renders the environment biologically toxic. A significant byproduct of the decomposition of decabromophenyl ether is hydrobromic acid (HBr). This acid is notorious for causing pulmonary edema when inhaled, having similar effects as mustard gas used in the First World War. In addition, many other brominated byproduct compounds are produced, which have significant toxicity, with the possible production of suspect carcinogens.

In the case of thermoplastics, the same issues arise with fire retardant additives. These plastics have the ability to be formed into various shapes and profiles with heat and pressure, without the presence of volatile organic compounds (VOCs) or hazardous air pollutants (HAPs). As an added benefit, thermoplastics may then be re-formed under heat and pressure to an entirely new shape and profile. This behavior makes them attractive for intermediary fabrication and recycling. Although fire retardant compounds are available that are easily processed into these polymers, the trade-off is they are almost exclusively brominated. These compounds are additionally attractive as they are the most economical. Nonetheless, upon combustion, they are the cause of the production of large volumes of smoke, rich with aggressive biological toxins.

The selection of a suitable smoke suppressant for curable and non-curable resins is not predictable. The selection is particularly difficult when flame retardants are employed, exacerbated by the complex interaction between the resin and the flame retardant agent. Although efficient in suppressing the rate of combustion of finished products that incorporate the resin, most flame retardants tend to affect adversely one or more key properties of the resin. For example, many flame retardant additives are ineffective at producing low density and low toxicity formulations.

It is well known that the flame retardant and smoke suppressive properties of additives in resin formulations vary greatly with the nature of the substrate. This is particularly true for intumescent compositions. The rapid formation of a protective char is highly dependent upon such factors as the combustion temperature, and the viscosity of the melt formed by the burning substrate.

Other considerations can also come into play, even where the properties of the retardant and suppressive properties of the composition are optimal. These considerations include the effect of the additive on the physical properties, color and molding characteristics of the base resin.

U.S. Pat. No. 3,293,327 describes the production of bicyclic phosphites, phosphonates, thiophosphates, and selenophosphates. These compositions are said to be stabilizers for vinyl halide resins. They are said to be useful as heat stabilizers for vinyl chloride resin, and as antioxidants for fats and oils.

Intumescent, fire-retardant coating compositions containing carbonifics, film-forming binders and phosphorous materials are well known in the art. U.S. Pat. Nos. 3,562,197; 3,513,114; 4,009,137; 4,166,743 and 4,247,435 disclose such compositions containing ammonium polyphosphates as the phosphorous containing material.

U.S. Pat. No. 3,654,190 discloses an intumescent paint comprising a resinous binder, a blowing agent, a phosphorous containing material, a source of chlorine a solvent, an anti-settling agent, a pigment and a surfactant.

U.S. Pat. No. 3,969,291 describes the use of an amide polyphosphate condensate as a fire-retardant additive in an intumescent coating composition. U.S. Pat. No. 3,914,193 discloses the similar use of a crystalline form of melamine pyrophosphate.

U.S. Pat. No. 4,166,743 describes an intumescent flame-retardant coating composition consisting substantially of a film-forming agent, an ammonium polyphosphate, one or more substances which are carbonizable under the action of heat, a dispersant, and optionally a filler. The coating composition additionally contains an ammonium polyphosphate activator weighing 0.5 to 50% of the weight of ammonium polyphosphate. The activator is constituted by at least one salt which contains water of crystallization which is liberated upon the composition being heated. As a coating, this material is unsuitable for fabrics.

U.S. Pat. No. 4,743,625 describes a flame-retardant polyurethane product that is produced by mixing and reacting a salt-forming compound with an acidic salt-forming compound containing phosphorus in a polyol and/or a polyisocyanate, and then reacting the polyol and polyisocyanate. That fire retardant mixture when exposed to excessive heat proceeds through two primary reaction phases. First, an early formation of a char layer is intended to slow the oxidative penetration into the foam core substrate, and second, a glassy layer of non-combustible vitrified material is intended to slow the penetration of radiant heat. However, borates and silicates typically melt together, at relatively low temperatures, to form brittle, fragile matrices. The fragile matrices there add no structural integrity to the char layer profile.

U.S. Pat. No. 4,801,625 describes a flame resistant composition having an organic polymeric substance in intimate contact with a bicyclic phosphorous compound, and a gas producing compound. The patent is silent on the use of bicyclic compounds to attain smoke suppressed flame retardant thermoset compositions.

U.S. Pat. No. 5,356,568 describes a solvent-based heat-resistant and fire-retardant coating containing carbonifics, film-forming binders, and phosphorous materials. Also described is an application where the coating is sprayed on steel and aluminum plates using a gravity flow gun. Not described are any smoke retardant properties, nor the use of the coating with resins or polymer plastics.

The development of additives for use with resins remains a highly empirical art. The predictability of the behavior of the final composition is rare to non-existent. The prior art has largely concentrated on developing highly specific additive combinations for particular resins and end-uses.

This is a particular problem when the fire retardant additive powder needs to be combined into composite structures and component products such as glass rovings, yarns, cloths, mat, and knitted fabrics. Typically, this is done by mixing the powder with high strength thermoset or thermoplastic resins. However, none of the prior art compounds are truly suitable for adding to curable resins.

The following U.S. patents describe flame retardants to be used with fabrics. However, those patents describe the fabric in a manner and style that is in contrast with the capabilities, functionality and specificity of the desired compounds and products. Exterior electrical cable wraps, door seals, a membrane to reinforce sprayable mastics or coatings or a mesh fabric with undefined intumescent materials are clearly in contradiction with the technical merits and uniqueness of the present invention.

U.S. Pat. No. 6,340,645 describes a flexible laminated fabric comprising a glass fiber web or glass fiber fabric coated with a four component intumescent composition. That composition is described as being suitable as a hot gas seal for fire doors, as fire protection curtains, and as fire protection windings surrounding individual cables or cable runs. The flexible fabric is intended for external use only to cover or seal a variety of components. The patent does not describe the ability of the intumescent constituent mix to reduce smoke when exposed to open flame. Neopentyl glycol and ethylene glycol phosphates have the propensity to generate smoke upon thermal decomposition. This is undesirable. That patent is extremely vague on the mechanism and smoke characteristics of the preferred polyol partial phosphates. The inorganic frame-forming candidate compounds are simple inorganic compounds which do not contribute significantly to structure.

U.S. Pat. No. 6,205,728 describes a laminated building component composed of a rigid resilient composite panel which is covered by a membrane. That membrane is selected from a group of non-combustible materials such as glass, quartz, carbon or stainless steel. The membrane is bonded to the panel with an adhesive and coated with a thin film fire protective intumescent coating. That membrane serves as a lath to hold and reinforce a spray, brushed or rolled intumescent coating. The patent is silent on the composition of the fire protective intumescent coating, and the coating's ability to reduce surface flammability or reduce smoke generated by the under-laminate structure.

U.S. Pat. No. 6,096,812 describes a low density epoxy-based intumescent fire resistive mastic coating with means for reinforcing the mastic with a carbon fiber mesh. That reinforced coating is strictly a surfacing treatment. Epoxies have a propensity to generate significant quantities of acrid smoke which can render an environment toxic. Additionally, the coating requires "at least one spumific" comprised of an isocyanurate. Isocyanurates are organic compounds containing nitrogen which can form hydrogen cyanide (HCN) as a thermal decomposition product contributing significantly to the toxic gas environment. That is also undesirable.

U.S. Pat. No. 6,001,437 describes a method for making high-temperature glass fiber by treating E-glass fiber with selected acids and then treating the fiber with organo-metallic material. Additionally, the patent describes the use of the fiber in thermal protective structures. The open weave mesh fabric is comprised of at least one layer of thermoplastic resin which had been pre-coated with subliming and/or intumescent material. The fabric may be pre-formed into a self supporting structure or embedded into a pre-existing structural automotive container.

Not described are specifics as to the constituents or processing ranges of the subliming or intumescent materials. No mention is made of a chemical mechanism which can reduce the flammability or smoke generation of the thermoplastic layer or underlying substrate.

In a combustion scenario, burning polypropylene thermoplastic produces particulate smoke, mostly carbon dioxide ($CO_2$), some carbon monoxide (CO) and water ($H_2O$) Conversely, polyvinyl chloride thermoplastic, which does have an inherent fire retarding characteristic, combusts to form large quantities of hydrochloric acid (HCl) and acrid, chlorinated organic compounds. Hydrochloric acid vapor is extremely toxic for human tissue. A common result of exposure to hydrochloric acid rich smoke is impaired vision, respiratory pain and narcosis, resulting in confusion and possible loss of consciousness. All of these effects are undesirable. The patent is silent on the ability of the thermal protective layer to address the biologically toxic byproduct species created during combustion of the thermoplastic glass layer or the underlying thermoplastic substrate.

The physiological effects of exposure to heat in fires and/or the resultant toxic smoke can result in varying degrees of incapacitation, permanent injury or death. Visual obscuration and painful irritation of the eyes can impair or reduce the efficiency of egress due to psychological and/or physiological effects. Breathing difficulties, lung inflammation, narcosis and respiratory tract injury, are physiological hazards potentially present in fire scenarios. Narcotic gases, e.g., carbon monoxide, hydrogen cyanide and reduced oxygen, can affect the nervous and cardiovascular systems, causing confusion, a period of intoxication, followed by a collapse and loss of consciousness, followed ultimately by death from asphyxiation. Any prior art compounds that include materials that produce these effects are undesirable.

More particularly, even though they are effective fire retardants, for the reasons stated above, it is ideally desirable to provide a non-toxic finished product that does not include any of the following classes of compounds: Brominated compounds, including decabromodiphenyl ether (DBPE, Deca-BDE), octabromodiphenyl ether (Octa-BDE), pentabromophenyl ether (Penta-BDE), hexabromocyclododecane (HBCD), decadbromobiphenyl ether (DeBBE) as well as other polybrominated biphenyls (PBB), tetrabromo phthalic anhydride and all related aliphatic and aromatic brominated compounds.

Some polymeric manufacturing resins, e.g., polyester, vinyl ester, epoxy, and adhesives are available which have tetrabromobisphenol-A and/or derivatives of such brominated monomer flame retardant compounds incorporated into the backbone of the resin chain during the manufacturing process. These resins "carry" their bromine and do not require additives other than antimony trioxide (ATO).

The heavy metallic bromine synergist antimony trihydroxide (ATO) greatly assists bromine in fire suppression but is nonetheless a heavy metallic.

Therefore, it is desired to provide a disparate assembly, containing a disproportionately large quantity of fire retardant, that is capable of intimately combining with a rigid composite surface during a secondary manufacturing process. When the assembly is positioned to envelop a pre-processed schedule of raw fibrous reinforcement and polymeric resin, and the secondary manufactured product has reached completion, the resultant assembly has lower surface flammability than would otherwise be achieved by the substrate material alone.

Bromine compounds can be concentrated in a surface boundary layer of a composite that will provide a significant reduction in surface flammability characteristics. However, resultant combustion species will be abundant with biologically toxic compounds.

A more attractive embodiment would be a non-toxic fire retarded surface, such as the toxicity contribution that would be provided by aluminum trihydrate (ATH), however with the efficiency of brominated compounds.

Although any fire retardant constituent or composition is a candidate for inclusion into the transport media of the present invention, the preferred embodiment of the article of manufacture would not contain compounds that yield products with undesirable physical and flame retardant characteristics that are inconsistent with current building and life safety regulatory standards, and are physiologically toxic.

SUMMARY OF THE INVENTION

Disclosure of the Invention

The present invention is a fire resistant structure comprising a substrate and a transport medium comprising a fire retarding composition. The transport medium is integrated with the substrate and forms a surface of the substrate. The composition preferably comprises a fire retardant, smoke suppressant, cement, ceramic, graphite, and/or combinations thereof. The composition is preferably an intumescent. The transport medium is optionally processed with fibrous reinforcements. The transport medium optionally comprises a cloth material, including but not limited to, fabric, non-woven fabric, woven fabric, knitted fabric, air texturized fabric, needle punched fabric, felt, fleece, crochet, knotted fabric, tufted fabric, lace, pile, twill fabric, glass fabric, carbon fabric, polyamide fabric, aramide fabric, ceramic fabric, mineral fabric, metal fabric, thermoset fabric, and/or thermoplastic fabric, etc. The transport medium optionally comprises glass fibers and is optionally affixed to a fabric. The transport medium is preferably positioned during manufacture of the substrate to form the surface of the structure. The transport medium optionally comprises a thermoplastic, thermoplastic fibers, a sheet, and/or a film.

The composition of the present invention is optionally dispersed in a crosslinkable polymer or a thermoplastic, or is optionally coated with an adhesive resin or is affixed to a thermoplastic medium. The substrate optionally comprises a thermoplastic. The transport medium is preferably heat consolidated with one or more thermoplastics into a solid prefabricated thermoplastic assembly. The composition is preferably integrated into a thermoplastic using heat and pressure. The transport medium is preferably manufactured by a process, including but not limited to, casting a thermoplastic, extruding a thermoplastic, calendering the composition into a polymer, and rolling. The composition optionally comprises an aqueous slurry which is applied to a cloth medium by a process, including but not limited to, coating with a knife-over fabric coater, dipping, roll coating, and/or spraying.

The present invention is also a method for increasing the fire resistance of a substrate. The method comprises forming a transport medium comprising a fire retarding composition and integrating the transport medium with a substrate so that the transport medium forms a surface of the substrate. The integrating step is preferably performed during manufacture of the substrate. The method optionally further comprises affixing the transport medium to a fabric. The forming step optionally comprises dispersing the composition in a crosslinkable polymer or a thermoplastic, or coating the composition with an adhesive resin. The forming step preferably comprises affixing the composition to a thermoplastic medium. The method preferably comprises heat consolidating the transport medium with one or more thermoplastics into a solid prefabricated thermoplastic assembly. The forming step preferably comprises integrating the composition into a thermoplastic using heat and pressure. The forming step preferably comprises a process, including but not limited to, casting a thermoplastic, extruding a thermoplastic, calendering the composition into a polymer, and/or rolling. The forming step optionally comprises applying an aqueous slurry comprising the composition to a cloth medium by a process, including but not limited to, coating with a knife-over fabric coater, dipping, roll coating, and/or spraying.

The present invention is also a method of manufacturing a fire resistant structure, the method comprising the steps of dispersing a fire resistant powder on a substrate and heat consolidating the powder and the substrate to form a composite structure comprising an integrated fire resistant surface. The method optionally further comprises the step of mixing the powder with a hot melt adhesive prior to the dispersing step. The method optionally further comprises the step of disposing hot melt adhesive on the substrate. The present invention is also a method of manufacturing a fire resistant structure, the method comprising the steps of mixing a fire resistant powder with an adhesive to form a slurry, depositing the slurry on a substrate, and drying the deposited slurry. This method optionally comprises heat consolidating the dried slurry and the substrate, either alone or with additional thermoplastic layers. The present invention is also a method of manufacturing a fire resistant structure, the method comprising the steps of dispersing a fire resistant powder on a first substrate, covering the powder with a second substrate, and heat consolidating the powder and the substrates to form a composite sandwich structure comprising an integrated fire resistant layer. In any of the above methods, the substrate is preferably selected from the group consisting of a polymer film, a polymer sheet, a reinforced thermoplastic, and a reinforced thermoset. The reinforced thermoplastic preferably comprises commingled woven glass fibers or layered glass fibers.

An object of the present invention is to increase the fire resistance of thermoset, thermoplastic, composite, fiberglass, and other resin-based substrates.

An advantage of the present invention is that the physical properties of the substrate are not significantly diminished since the fire retardant film, sheet or fabric is bound only to the surface of the substrate.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
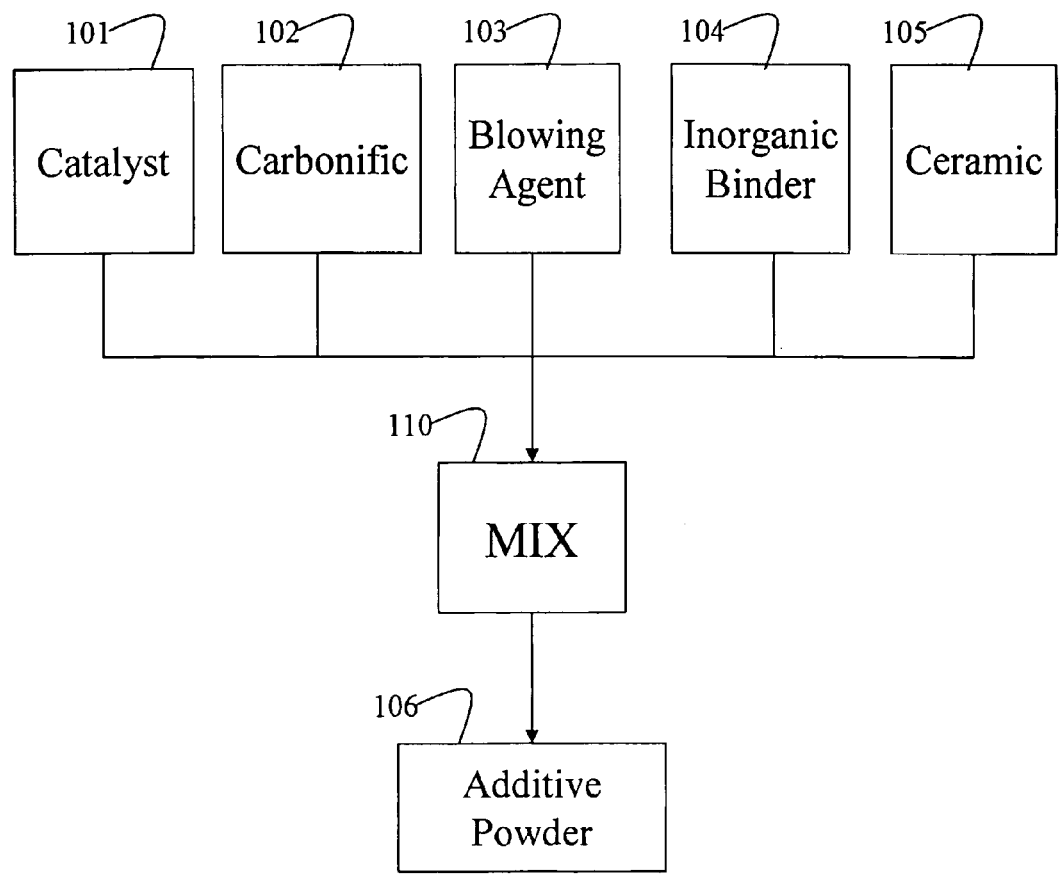
FIG. 1 is a flow diagram of a process for manufacturing an intumescent additive powder according to an embodiment of the invention.

The invention provides an assembly of fire retardant and smoke suppressing constituents that are combined with a transporting medium, including but not limited to a fabric or an adhesive matrix, which is preferably subsequently employed to envelop or face an un-processed schedule of composite raw materials. Upon further curing or consolidation, during a secondary manufacturing process, the fire retardant transporting medium preferably becomes the surface of the structural matrix, and is preferably thus as durable, rigid, and hard as the surface of the unmodified substrate. This novel composition includes an additive powder and a supporting media capable of transporting the powder to a secondary manufacturing process, typically used in polymeric reinforced composites or laminates fabrication.

As used throughout the specification and claims, the term "substrate" means any rigid laminate or composite, including but not limited to resin-based materials, polymers, reinforced composites, thermosets, thermoplastics, fiberglass, and the like.

In one embodiment, the additive powder is incorporated on and within a transporting profile of a fabric, and preferably held temporarily in place by a feeble adhesive binder that provides the minimal adhesion effectiveness required, prior to a secondary manufacturing. The fabric may be selected from a wide assortment of commodity and specialty industrial textile materials in a number of profile thicknesses dependent on the particular application.

In composite resin and reinforcement applications, the transport medium is typically a single ply surfacing veil that is capable of chemically bonding with a thermoset resin. A multi-layer stacked schedule is also possible. The fabric can be positioned in an isolated section or area of a part during fabrication for enhanced localized fire and smoke protection.

Alternatively, a light bias weight glass fabric functioning as a transport medium can be used as a primary reinforcement material in a laminate, such as a thin skin on a cored "sandwich" panel, and other cellular foam constructions.

In another embodiment, the additive powder is incorporated into thermoplastic to produce a transport media analogue to a film or sheet. The thermoplastic can be selected from a wide assortment of commodity and specialty polymer materials to form films and sheets in a number of profile thicknesses dependent on the particular application.

The interior of a laminate of the present invention can be adulterating filler free, with the fire retardant situated only where it's needed, i.e., at the point of contact with an open flame or high radiant heat. If addition of a fire retarding additive, mixed en masse into the structural resin component, is necessary for a composite specimen to pass an exceptionally aggressive fire test protocol, then less fire retardant additive can be incorporated into the specimen as would otherwise be necessary with prior art fire retardant additives.

The fire retarding assembly according to the invention reduces a substrate's ability to ignite when exposed to open flame or high radiant heat, reduces the surface flammability characteristics, stops the spread of flame, minimizes smoke density generated by a combustion event, increases the time to structural failure of the assembly in a catastrophic fire or high thermal event, and suppresses biologically toxic gas emissions from the underlying substrate in a burning or smoldering condition.

These fire retarding assemblies can be used in a range of industrial fabrication processes, such as pultrusion, filament winding, compression molding, resin transfer molding, vacuum assisted resin transfer molding, hand lamination, press molding, reaction injection molding, impression molding, and secondary associated processes as well. When incorporated into a thermoplastic substrate under heat and pressure, the assembly can be thermoformed, vacuum formed, and re-formed.

Additive Powder

As discussed above, all fire retardant additives in general polymeric use, whether designed for thermoset or thermoplastic resins, are candidate constituents or compositions for transport by supporting media into manufacturing substrate processes that necessitate fire retardancy.

The present invention preferably provides a flame retardant and smoke suppressive powder that is compatible with both polymeric structural resins and the industrial manufacturing processes that are devoted to converting resins and reinforcements into composite structures. Additionally, those manufacturing processes have the capability to incorporate powders into fabrics, films and sheets. When the powdery additive according to the invention is positioned in the surface of a substrate, the propensity of the otherwise untreated resin to combust, generate toxic smoke, and transmit heat when exposed to an open flame or excessive heat is significantly reduced.

Single compound candidates, aside from the family of brominated fire retardants, are relatively inefficient and have a tendency to require an undesirable thicker profile surface. Historically, it was discovered that a means to attain a more desired result was to combine a multitude of single constituent compounds, each with different thermal and decomposition characteristics. It was discovered decades ago that some particular distinct candidate fire retardants, when mixed together in certain proportions, exhibited synergistic behavior when exposed to open flame. The generic formula for such a system was the use of an acid forming compound, a char forming compound and a gas forming compound. The mixture, upon exposure to high heat, decomposes in the following order with the noted end result: a) An acid former such as a phosphorus compound decomposes to form phosphoric acids that lower the decomposition temperature of the char former; b) The char former, often an alcohol, forms a carbonific char and typically further produces fire snuffing gases, including water vapor and carbon dioxide; and 3) The gas forming constituent, typically a carbon and nitrogen compound, also produces fire snuffing gases, e.g., typically carbon dioxide, ammonia and urea.

The additive powder of the present invention preferably comprises a mixture according to the composition cited above, i.e. an acid former, a char former and a gas former, with the addition of a cement. The additive in its final form is typically a homogeneous, white fine powder. The invention does not seek to foam or expand, nor vitrify upon exposure to open flame or high radiant heat. The acid, char, and gas formers, as well as the cement, act only in the guise of a fire mitigating constituent system. When the invention is employed, it provides a fire resistant surface that suppresses smoke and reduces the transmission of heat.

Each class of constituent in the composition compounds contributes a specific property to the formulation that is advantageous to the success of the invention in yielding a reduced propensity for the resin substrate so treated to burn, smoke, generate toxic gases or transmit heat.

Fabric

Fabrics employed to transport the fire retardant can be woven, non-woven, knitted, air texturized, needle punched, felt, fleece, crochet, knotted, tufted, lace, pile, twill or mixtures thereof. The transport fabric may comprise glass, carbon, polyamide, aramide, acrylic, ceramic, mineral, metal, thermoset, thermoplastic, any other man-made natural fabric material, or mixtures thereof, which can be assembled in some fashion into a cloth or fabric material suitable as a transport medium. Natural materials include but are not limited to cotton and hemp. The fibrous transport medium material is preferably non-combustible and does not make a fuel contribution in the event of exposure to a pyrolysing event or radiant heat.

A transport assembly comprised of reinforcement fibers and the fire retardant and smoke suppressing powder according to the invention overcomes the noted disadvantages of highly loading a resin en masse with fire retarding fillers. By putting an extremely high concentration of the fire retardant and smoke suppressing powder in a surfacing medium, the outermost surfaces of the part can be fire hardened and provide smoke suppression.

The additive powder according to the invention can be applied to the fabric by a variety of methods. The pure, dry powder can be mechanically applied to a medium by, including but not limited to: deposition, rubbing, or inserting on, or within, the fabric material.

A pure liquid slurry of the fire retarding powder and an evaporative liquid can be applied by spraying, dipping, roll coating or other technique common to the paper or textiles industries, where the liquid slurry or foam is incorporated on and into a medium and the evaporative liquid is driven off in a second stage by a variety of techniques. These techniques include, but are not limited to, convective heat, exposure to quartz heating elements, vacuum, etc.

Techniques such as dipping and pinch-rolling can be used to produce symmetrical layers on each side of the fabric, e.g., a fire retarding layer on the outside and a reinforced layer on the inside. In the preferred fibrous embodiment, the strands, threads or rovings which comprise the medium are open sufficiently to hold a substantial quantity, by weight, of the additive powder as compared to the weight of the unmodified medium.

The preferred transport media has an open structure or pore volume to enable permeability of a polymer resin fluid. Permeability allows structural polymer resins to flow or permeate through the filled media, wetting or saturating the powder and fibrous medium from every direction. For quantification, permeability is typically measured by ASTM D737-96 "Test Method for Air Permeability of Textile Fabrics."

The adhesive preferably makes no contribution as a fuel source in the event of a fire episode. The minor adhesive component is completely compatible with the assembly when it is integrated, affixed or attached, and has feeble but sufficient tack so that the transport media can be handled, cut, stacked, draped, wound, molded, or stitched without dusting or dislodgement of the resinous clinging powder. The glue-like adhesive is stable under normal processing temperatures and pressures so that the medium can be handled by conventional manufacturing and conversion processes.

Adhesive

The inventive constituent that provides adherence of the fire retarding and smoke suppressing powder to fibrous composite reinforcements preferably comprises an adhesive resin. As nearly all resins generate smoke upon combustion, this adhesive is preferably employed in the most minimalist fashion. Its function is typically not to impart lengthy life-cycle integrity or behave in the manner of a film-forming binder. Its essential characteristics are preferably that it effectuates the enclosure of the powder particulate and allows reciprocal adhesion between the powder and composite reinforcements. The adhesive resin preferably comprises, but is not limited to, a styrenic, olefinic, acrylic, cellulosic, polyester, phenolic, rosin, shellfish resin or polyamide. Any compound or material which exhibits an ability to hold the fire retarding composition together while on and/or within a reinforcement media may alternatively be used. The adhesive binder preferably makes no contribution as a combustible fuel source nor generates smoke when exposed to open flame or high radiant heat.

Thermoplastic Transport Media

Thermoplastic polymer can be used to encapsulate the fire retarding additive and subsequently processed into an assembly analogue to a film or sheet. The thermoplastic can be selected from a wide assortment of commodity and specialty polymer materials to form films and sheets in a number of profile thicknesses dependent on the particular end application. The polymer may comprise, but is not limited to, an olefinic.

The benefit of incorporating the additive into a thermoplastic sheet, rather than relying on fibrous reinforcements alone, allows the heat consolidation (i.e. melting into under pressure) of the sheet with other resin dry thermoplastic substrates to form the surface of the assembly without the need for adding additional resin, for example, with a thermoplastic slip-sheet. Additionally, the thermoplastic transport medium can be heat consolidated, i.e. melted into under pressure, on and into an alien prefabricated thermoplastic assembly, such as a solid panel, to form a new fire hardened surface, as the fire retardant has been wet-out with and carries its own thermoplastic resin.

Manufacturing Processes

FIG. 1 shows a process for manufacturing the additive powder 106 according to the invention. The process preferably mixes the catalyst 101, the carbonific 102, the blowing agent 103, the inorganic binder 104 and the ceramic 105, all powders, into a uniform powder composition. The powder composition can be sifted, milled or further processed as described below.

Figure 2:
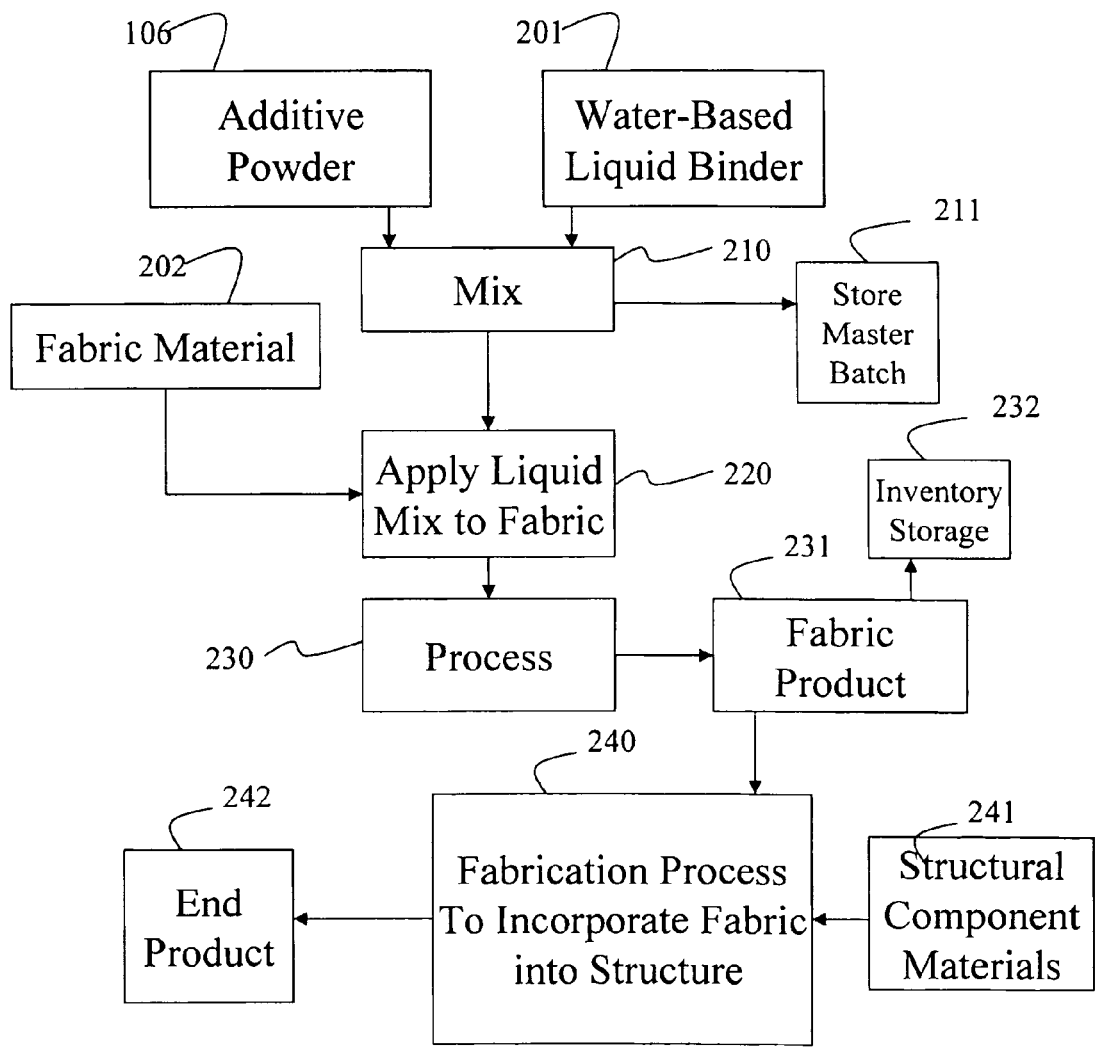
FIG. 2 is a flow diagram of a process for manufacturing a flame retardant and smoke suppressive fabric according to an embodiment of the invention.

FIG. 2 shows a process for manufacturing a fabric product to be integrated within an end product 242. First, the additive powder 106 is mixed 210 with a water-based liquid binder 201. The result can be stored as a blended master batch 211 or applied 220 as a liquid mix to a fabric material 202, such as a nonwoven glass veil, and processed 230, e.g., dried by heating, to produce a dry fabric product 231. The dry fabric product 231 is stored typically in rolls. These rolls can be kept for extended periods in inventory storage 232 for later use, if so desired. The fabric product 231 is incorporated with structural component or fabrication or construction materials 241 during a fabrication process 240 to produce an end product 242 containing the fabric product 231 within a surface of the end product 242. Fabrication process 240 may include methods such as heat consolidation when materials 241 comprise a reinforced thermoplastic, or reacting fabric product 231 with reinforced thermoset resin.

Figure 3:
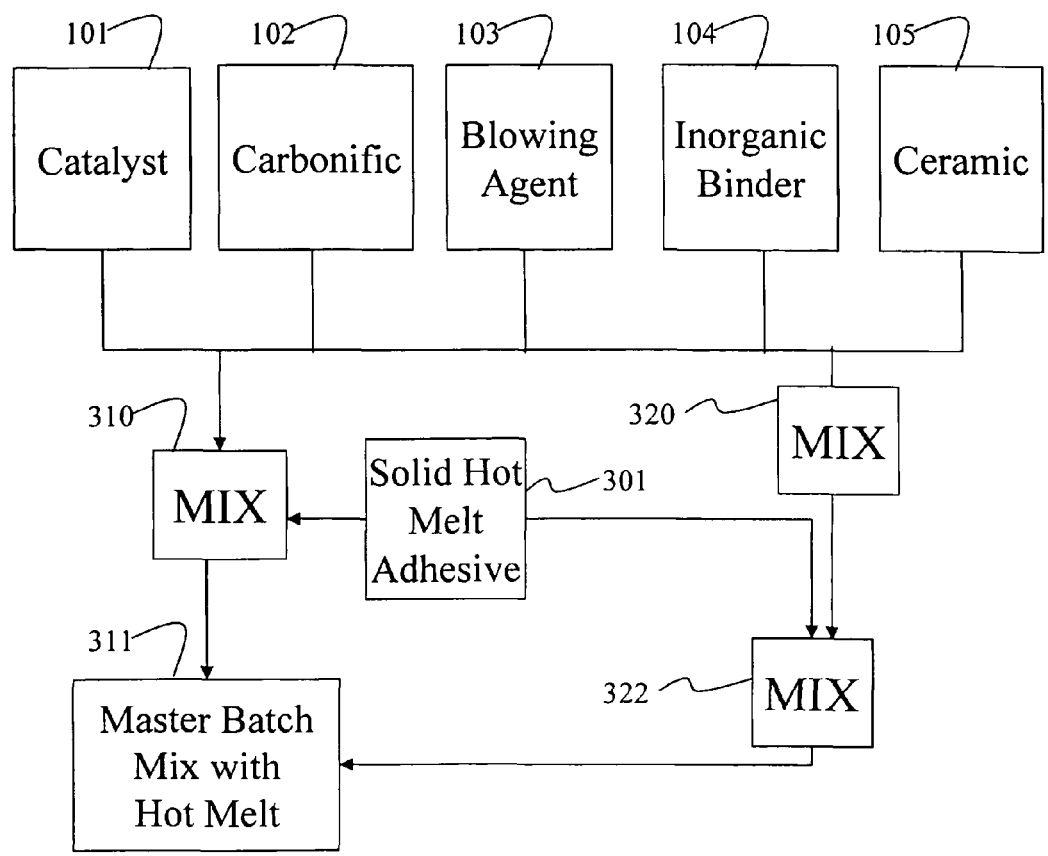
FIG. 3 is a flow diagram of a process for manufacturing an intumescent additive powder composition with a solid hot melt adhesive applied to a fabric according to an embodiment of the invention.

FIG. 3 shows a process for manufacturing the additive powder composition with a solid hot melt adhesive 301. The process can be accomplished two ways. First, the catalyst 101, carbonific 102, blowing agent 103, inorganic binder 104 and ceramic 105 are mixed 310 with the solid hot melt adhesive 301 in a blending step to produce an additive master batch mix with hot melt 311. Second, the catalyst 101, carbonific 102, blowing agent 103, inorganic binder 104 and ceramic 105 are mixed 320. This additive powder mix 320 is then mixed 322 again to produce the additive master batch with hot melt 311.

Figure 4A:
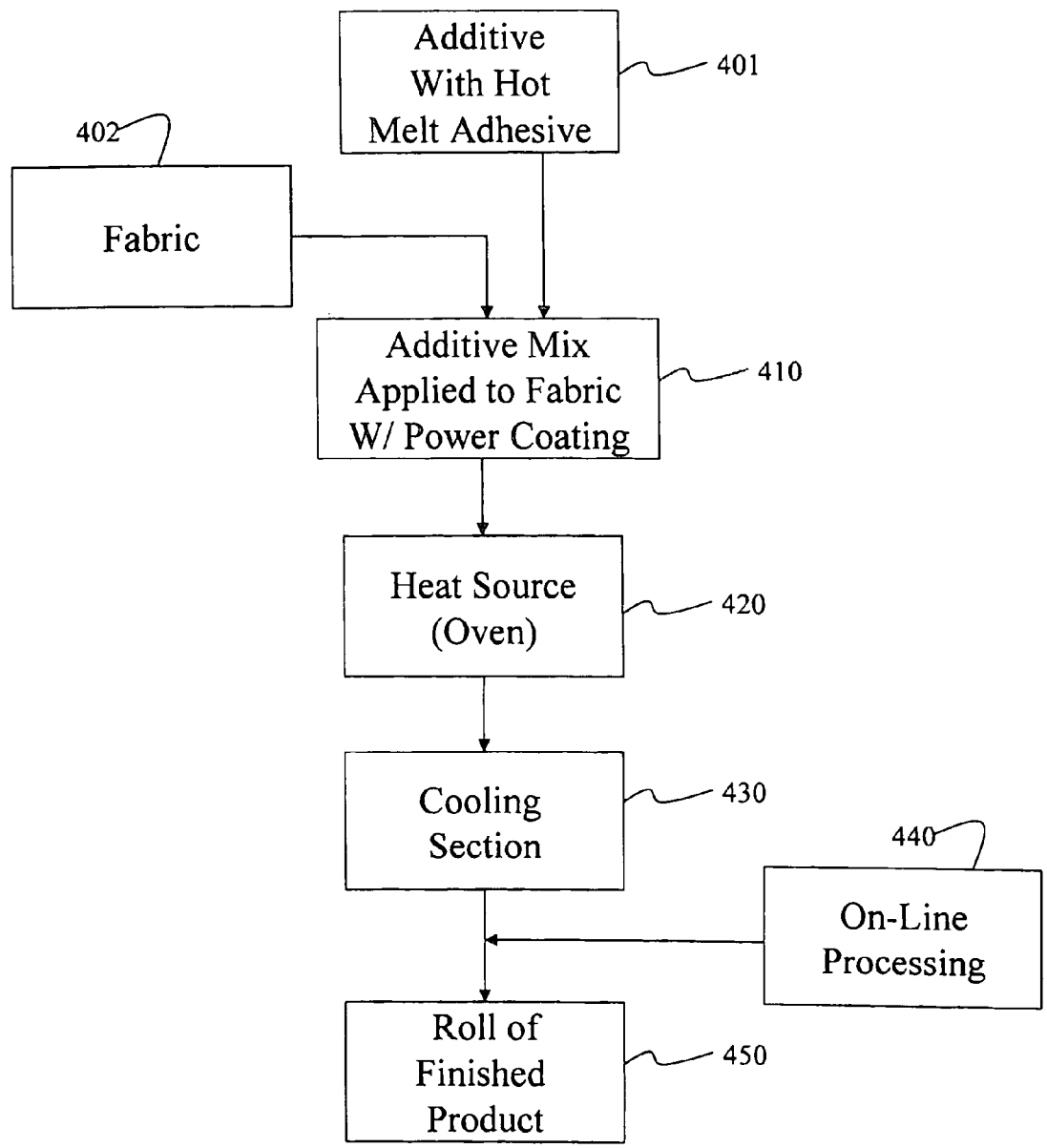
FIG. 4A is a flow diagram of a process for making a fabric with an additive powder constituent using heating and cooling steps according to an embodiment of the invention.

FIG. 4A shows a process for making a fabric with additive powder constituent using heating and cooling steps. Additive powder with pre-mixed hot melt adhesive 401, produced as described above, is applied to a fabric 402 by means of a powder or roll coater machine 410. The fabric with powder coating proceeds through a heat source, e.g., an oven, and is cooled 430. Then, the fabric can be processed 440 directly on-line or stored as rolls of finished product 450 for processing at a later time.

Figure 4B:
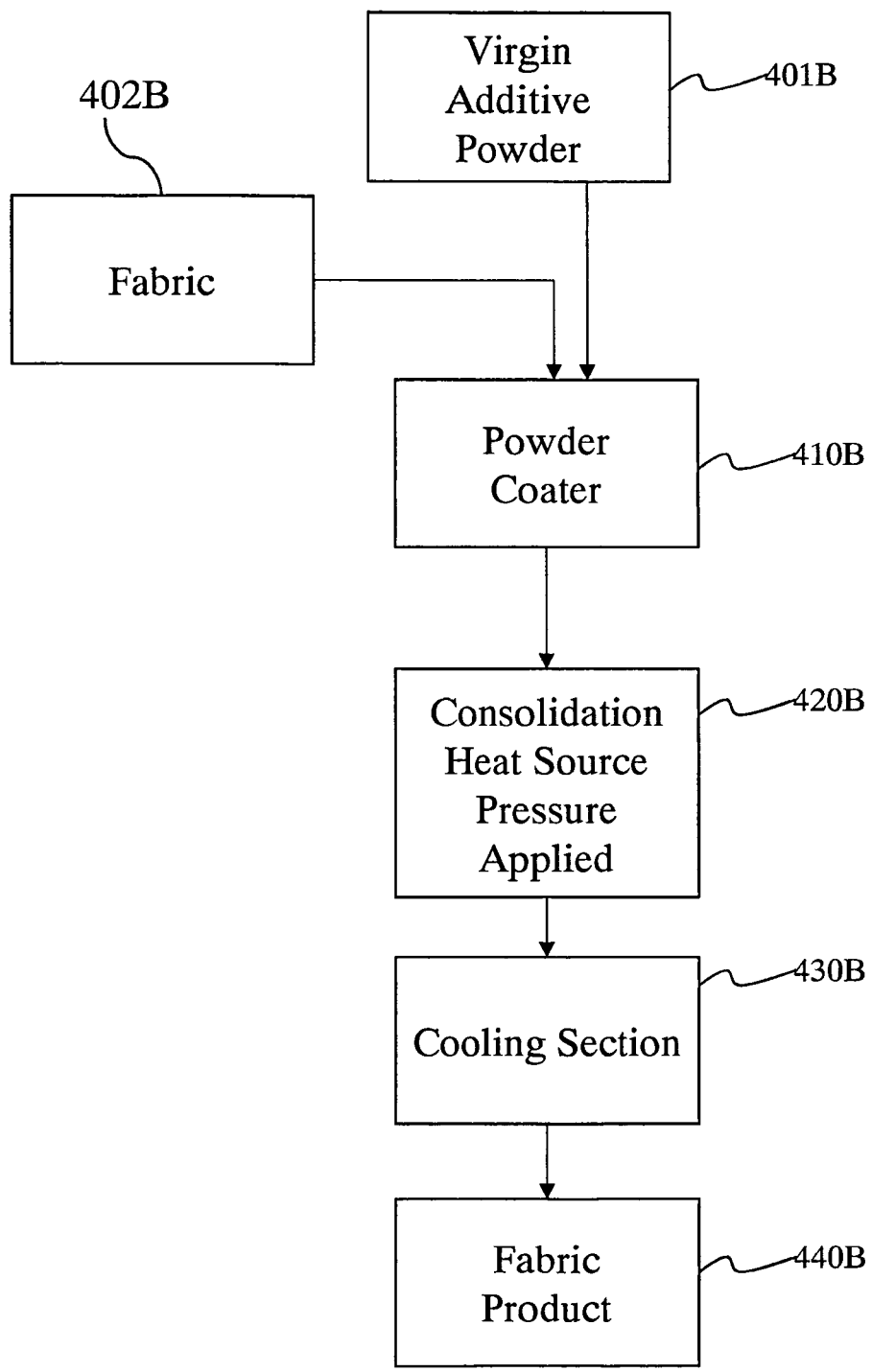
FIG. 4B is a flow diagram of an alternative process for making a fabric or assembly with an additive powder constituent using heating and cooling steps according to an embodiment of the invention.

FIG. 4B shows a process for making a fabric, or assembly, with additive powder constituent using heating and cooling steps. Additive powder 401B is preferably applied to fabric 402B by means of a powder or scatter coater 410B. The fabric with the scatter or other coating preferably proceeds through a heat source, preferably where pressure is applied 420B, and cooled 430B. Consolidated fabric or assembly 440B can be processed directly or stored as rolls of finished product for processing at a later time.

Figure 4C:
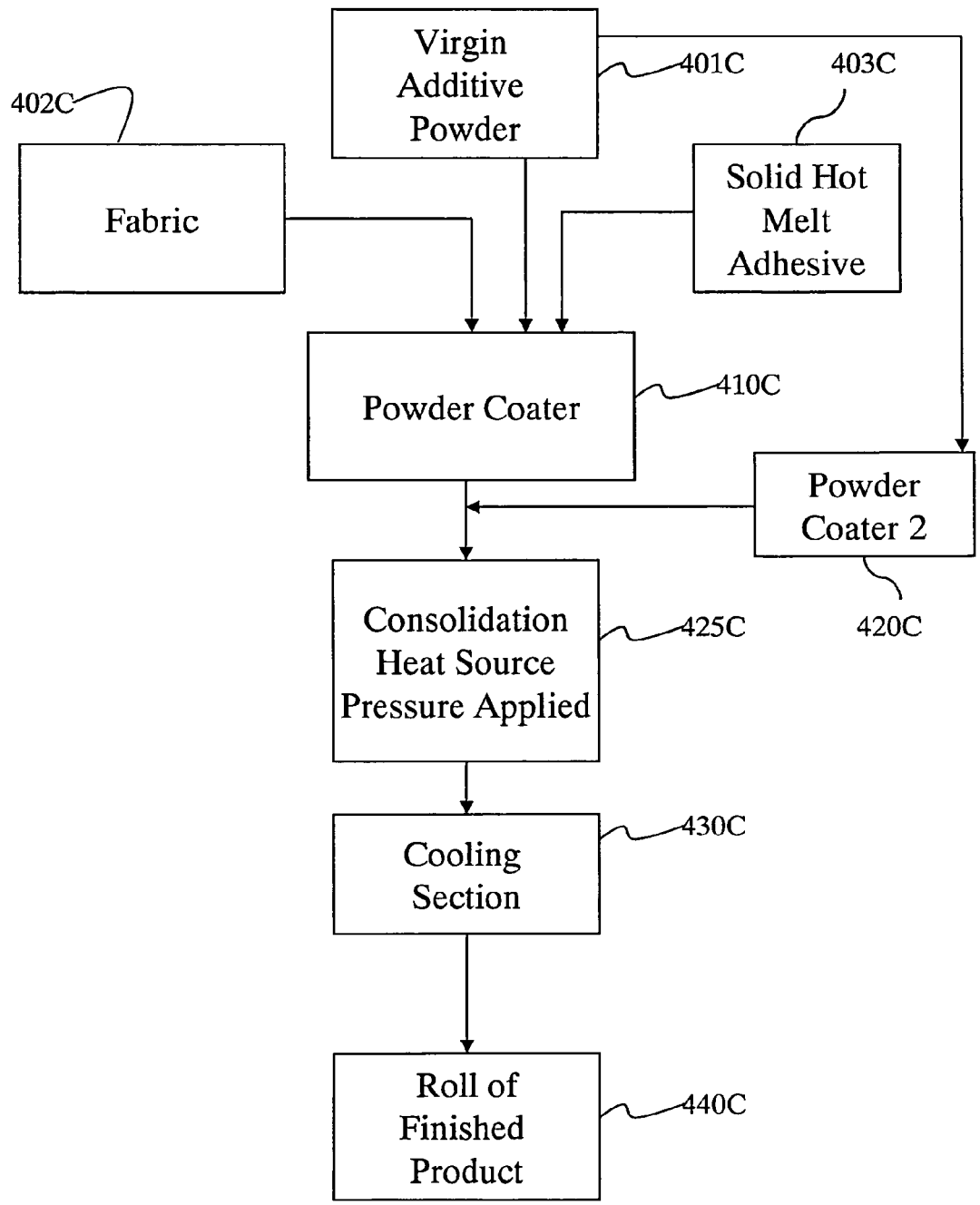
FIG. 4C is a flow diagram of a process for making a fabric or assembly with an additive powder constituent and a hot melt adhesive according to an embodiment of the invention.

FIG. 4C shows a process for making a fabric, or assembly, with additive powder constituent and a hot melt adhesive. Fabric 402C preferably has hot melt adhesive 403C and additive powder 401C applied to it by means of a powder or scatter coater 410C. Separate powder coaters 410C, 420C may optionally be used for hot melt adhesive 403C and additive powder 401C. The fabric with the hot melt and additive powder scatter coating preferably proceeds through heat source 425C, e.g., an oven, preferably where pressure is applied, and is cooled 430C. Consolidated fabric or assembly 440C can be processed directly or stored as rolls of finished product for processing at a later time.

Figure 5:
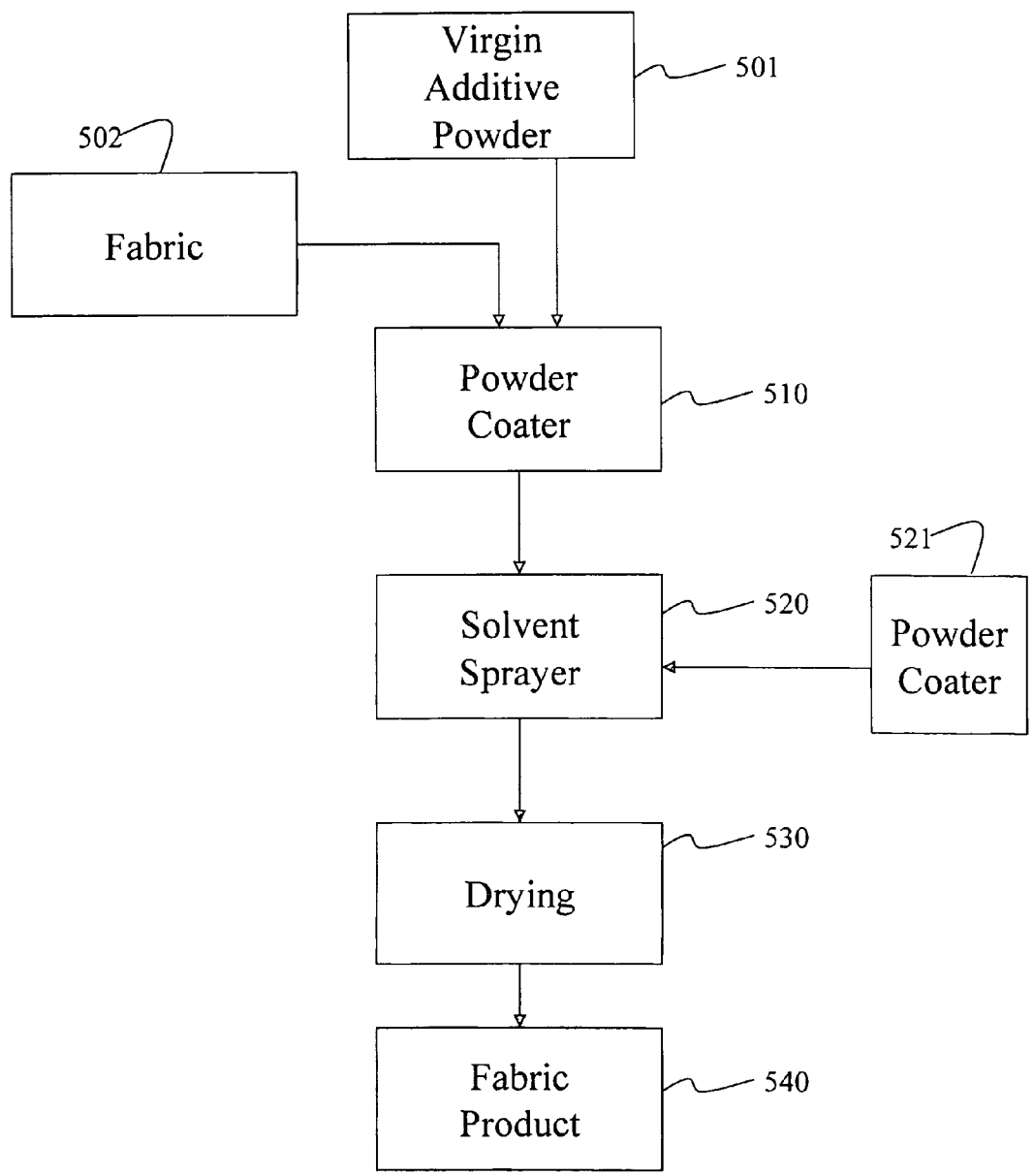
FIG. 5 is a flow diagram of a process for applying a powder coating to a fabric according to an embodiment of the invention.

FIG. 5 shows a process for applying a powder coating, produced as described above, to a fabric and binding the powder to a fabric by employing a solvent spray apparatus. The process applies the additive powder 501 to a fabric 502 using a powder or roll coater machine 510. A solvent sprayer 520 sprays an organic solvent based adhesive binder onto one or both sides of the coated fabric. Additional additive material can be applied with a second powder coater 521. The additive fabric is dried 530 to produce the finished fabric product 540.

Figure 6:
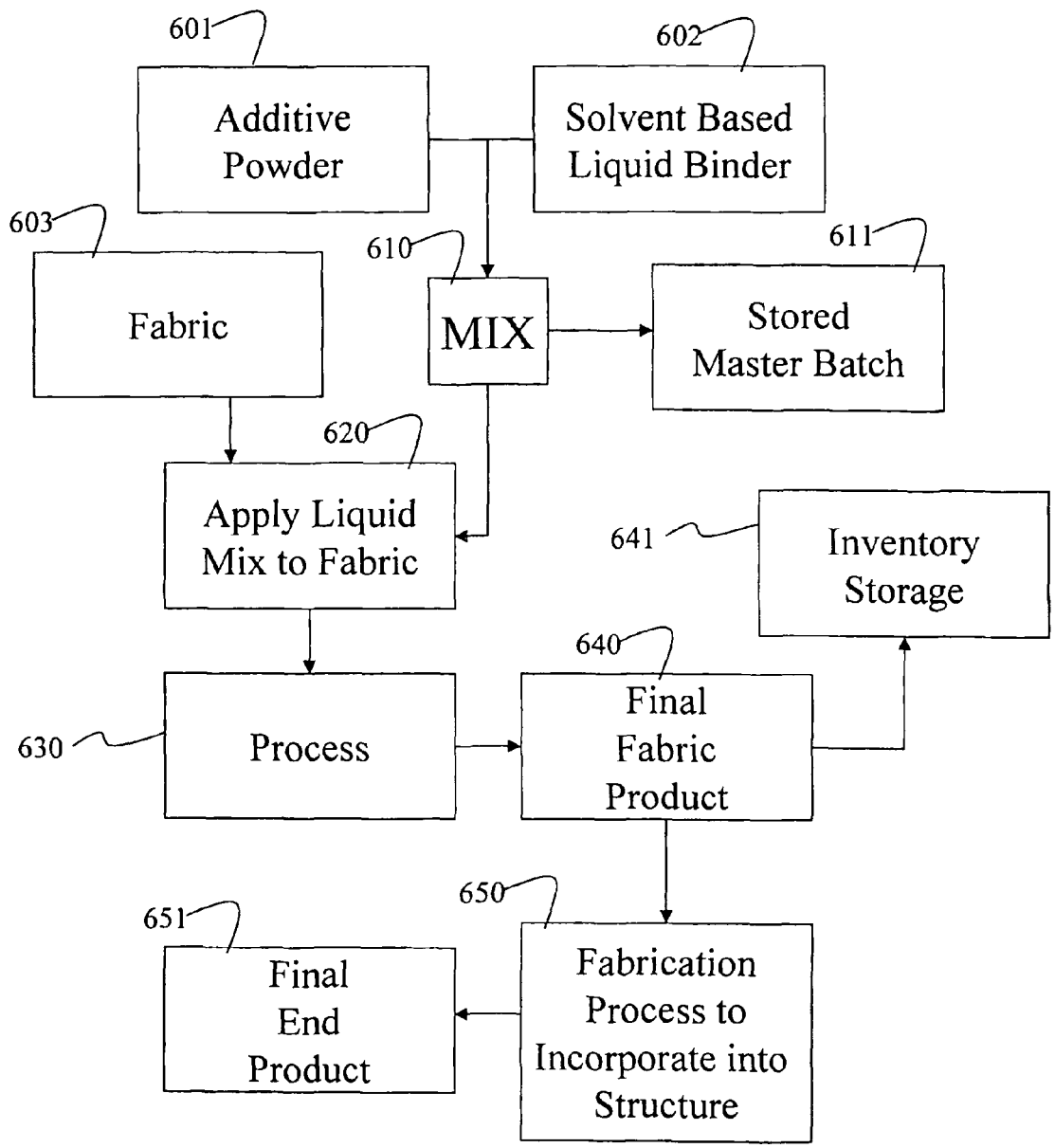
FIG. 6 is a flow diagram of a process for applying an additive powder to a fabric according to the invention.

FIG. 6 shows a process for applying a slurry including the additive powder 601 and a solvent based liquid binder 602 to produce a final fabric product 640, and then a final end product 651. First, the additive powder 601 and the solvent-based liquid binder 602 are mixed 610 to form a slurry. The slurry can be stored as a master batch 611. After mixing 610, the slurry is applied 620 to a fabric 603 and processed 630 into a final fabric product 640. The final fabric product 640 can be put in inventory storage 641. The final fabric product 640 can be used immediately in a fabrication process whereby it is integrated using a structural fabrication process 650 to manufacturer a final end product 651.

Figure 7:
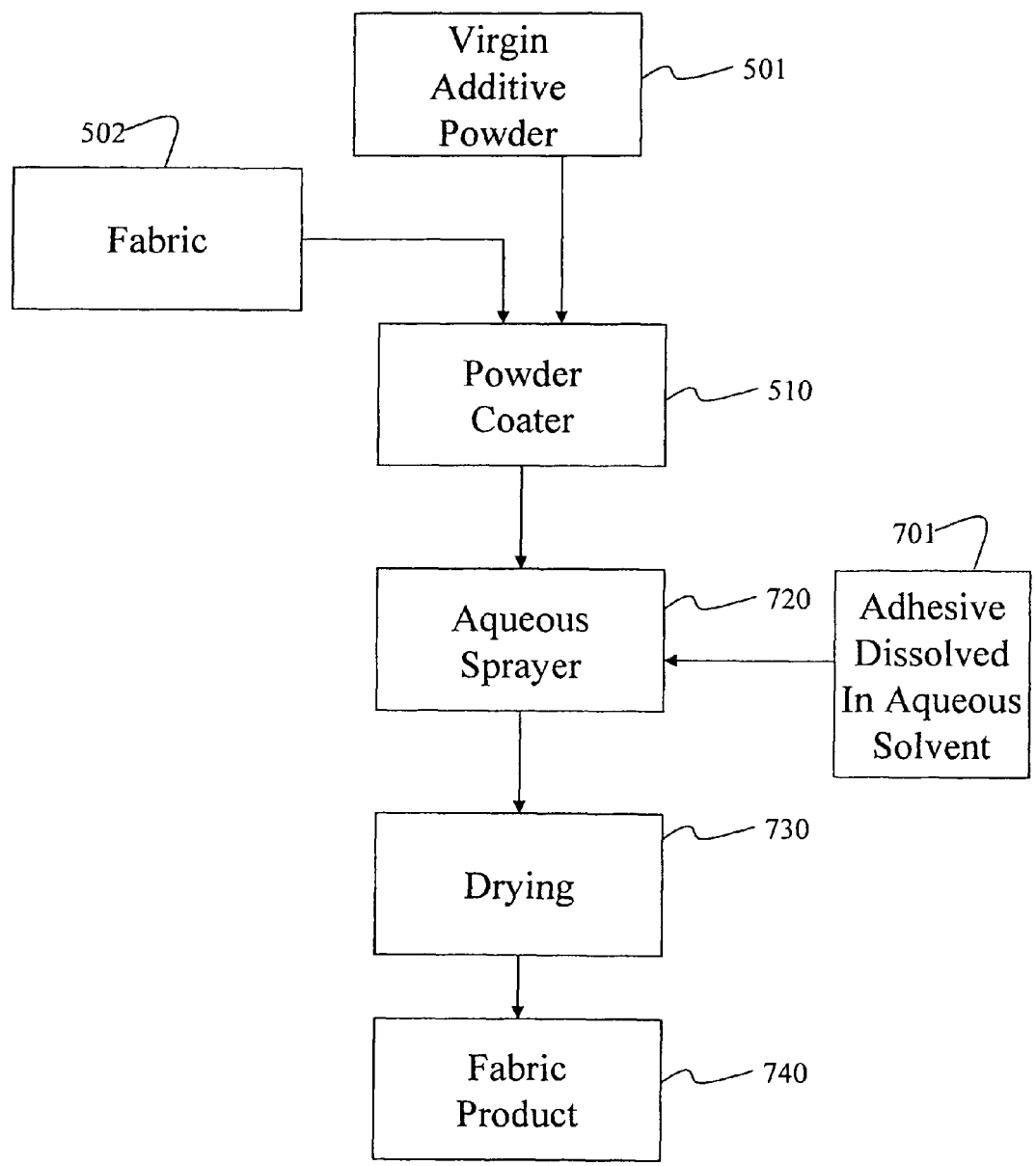
FIG. 7 is a flow diagram of a process for adhering an additive powder to a fabric according to an embodiment of the invention.

FIG. 7 shows a process for adhering the additive powder 501 to the fabric 502 with a water based adhesive by means of an aqueous sprayer 720. First, the additive powder 501 is applied to the fabric 502 using the powder coater 510. The coated fabric is then sprayed with an adhesive dissolved in aqueous solvent 701 by means of an aqueous sprayer. The fabric proceeds through a drying 730 step to produce the final fabric product 740.

Figure 8:
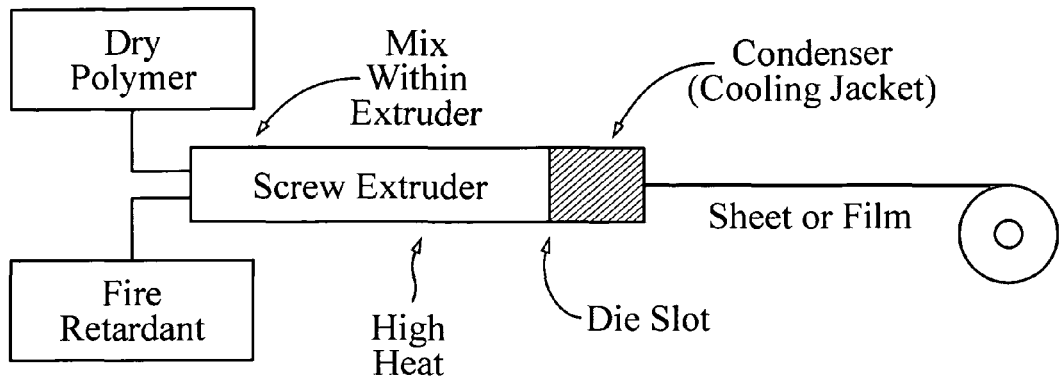
FIG. 8 is a depiction of extrusion of a thermoplastic fire retardant sheet or film of an embodiment of the present invention.

FIG. 8 illustrates extrusion of a thermoplastic sheet or film of the present invention. Typically the dry thermoplastic polymer and the fire retardant are fed into a screw extruder. The materials are preferably mixed as they migrate down the barrel(s) and are exposed to high heat towards the end of the extruder. The mix is then preferably forced through a slotted die and enters a cooling station. The subsequently formed sheet or film is then preferably wound as rolls.

Figure 9:
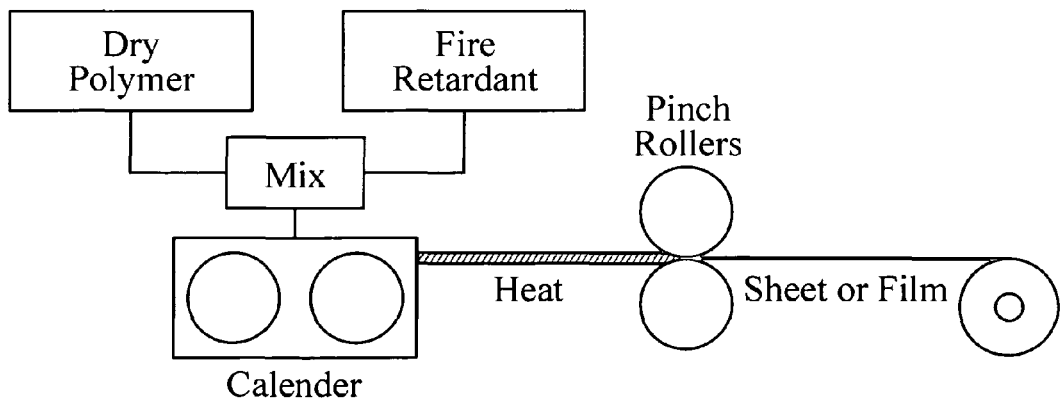
FIG. 9 illustrates calender production of a fire retardant sheet or film of an embodiment of the present invention.

FIG. 9 illustrates calender production of a sheet or film of the present invention. The dry thermoplastic polymer and the fire retardant are preferably fed to a mixer. The mixer preferably deposits the mixture into a calendar, which preferably further mixes the mixture to homogeneity. The calendered sheet is the preferably drawn and heated as it travels to, and subsequently through, pinch rollers. The subsequently formed sheet or film is then preferably wound as rolls.

Figure 10:
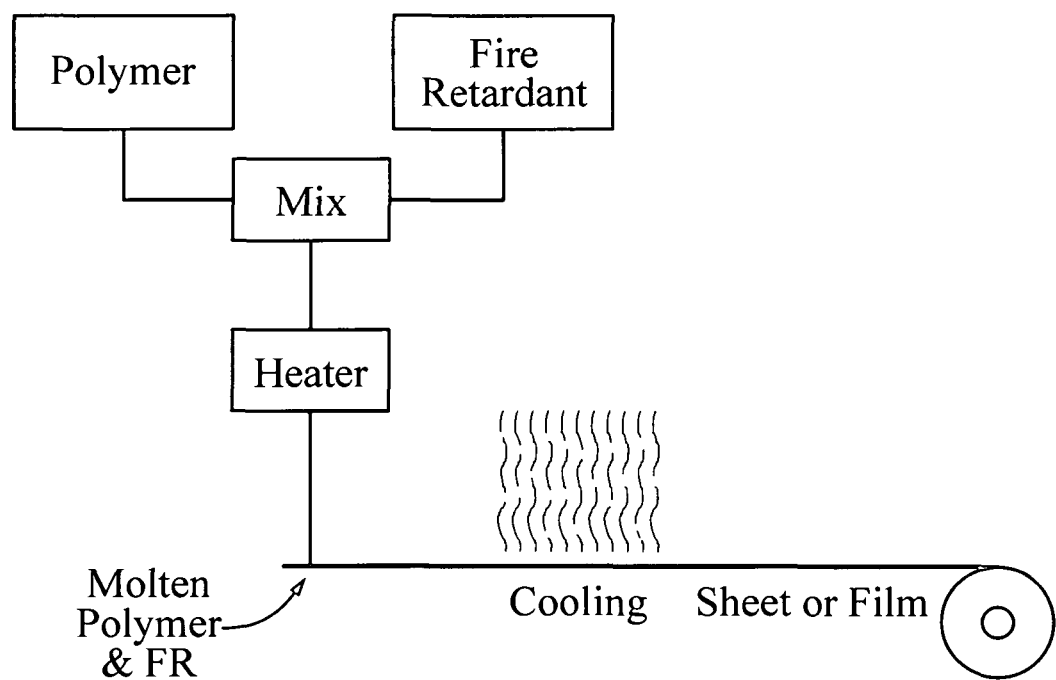
FIG. 10 illustrates casting a fire retardant sheet or film of an embodiment of the present invention.

FIG. 10 illustrates the casting of a sheet or film of the present invention. The dry thermoplastic polymer and fire retardant are preferably fed to a mixer. The resulting mixture is preferably moved to a heater that heats the mixture to a condition where it will flow onto a transitional moving cooling station. The subsequently formed sheet or film is then preferably wound as rolls.

Figure 11:
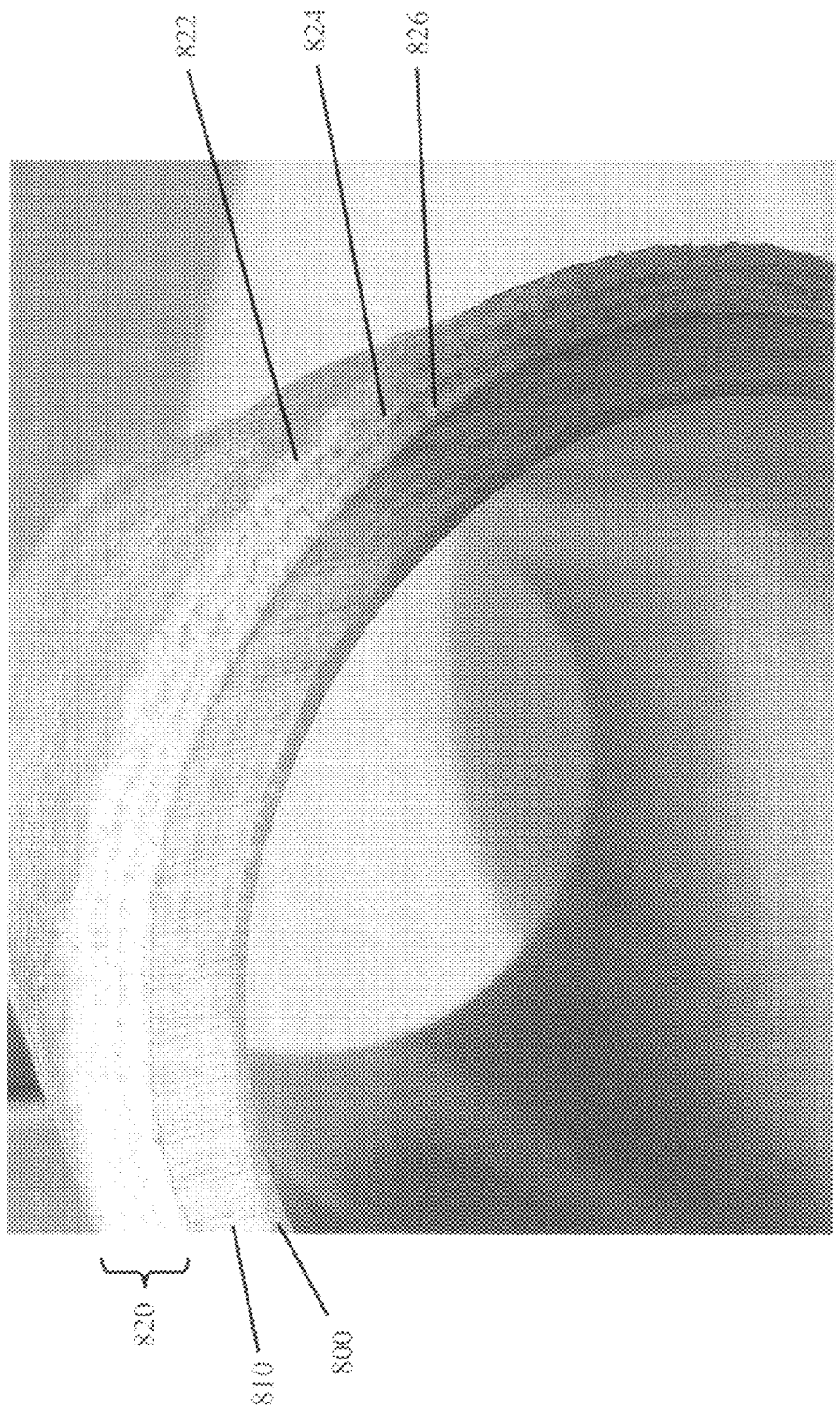
FIG. 11 is a photograph of a pipe assembly showing the fire retardant coating of an embodiment of the present invention.

FIG. 11 is a photograph of a pipe assembly showing the fire retardant coating of the present invention. This particular pipe assembly can withstand a petroleum jet fire test required by the American Bureau of Shipping for fire fighting water delivery pipe on oil drilling rigs. It is also corrosion resistant to sea water. As shown in FIG. 11, the pipe first layer is a corrosion resistant, resin rich liner layer 800. A second layer 810 is a fiber reinforcement layer that provides the physical characteristics and strength necessary for the application. The third layer 820 comprises three fire retardant and smoke suppressive layers 822, 824, 826, although any number of layers may be utilized in accordance with the present invention. Filament wound pipe is produced by wrapping a tapered mandrill with resin wet cloth, preferably in the orientation of stripes on a barber pole, under high tension. The fire retardant surface, in this particular embodiment, was wound three times and the individual wound layers 822, 824, 826 can be seen.

Figure 12:
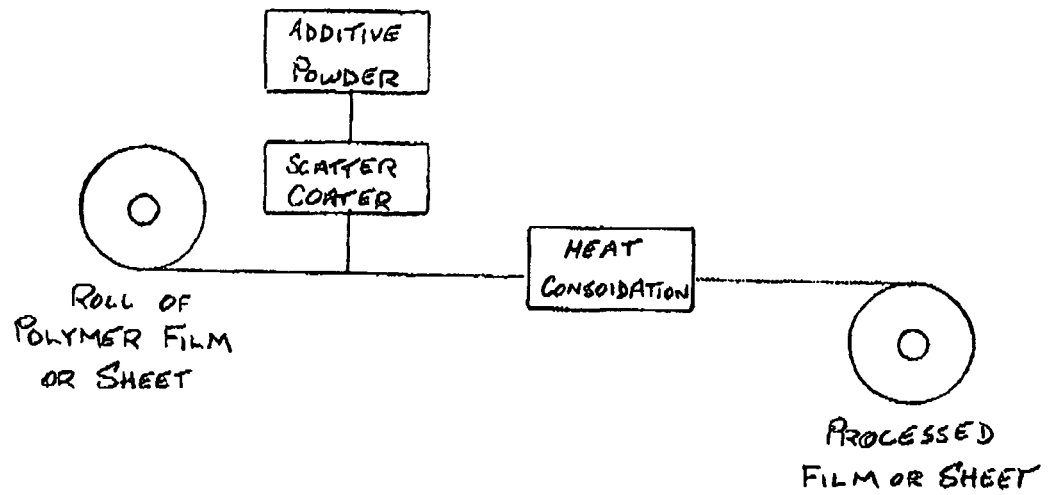
FIGS. 12-15 depict processes for manufacturing various embodiments of the present invention.
Figure 13:
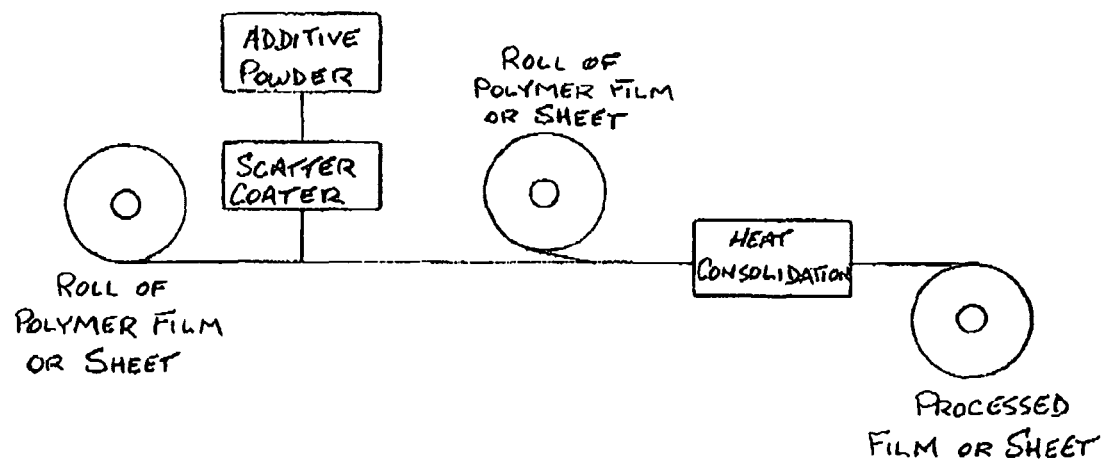

FIGS. 12-15 depict processes for manufacturing various embodiments of the present invention. In FIG. 12, a roll of polymer film or sheet is unwound moving to the right. Additive flame retardant powder is deposed preferably by a scatter coater on to the film. The coated film is preferably further processed by heat consolidation (heat and pressure), then cooled. The modified film, i.e., a combined polymer film and additive powder, is preferably then re-wound into a processed roll. In FIG. 13, after scatter coating a second polymer film is applied from the top forming a sandwich construction (film-powder-film). The sandwiched films are preferably further processed by heat consolidation (heat and pressure then cooled). The processed modified sandwiched film, i.e., a combined polymer films and additive powder, has formed a single sheet that is preferably then re-wound into a processed roll.

Figure 14:
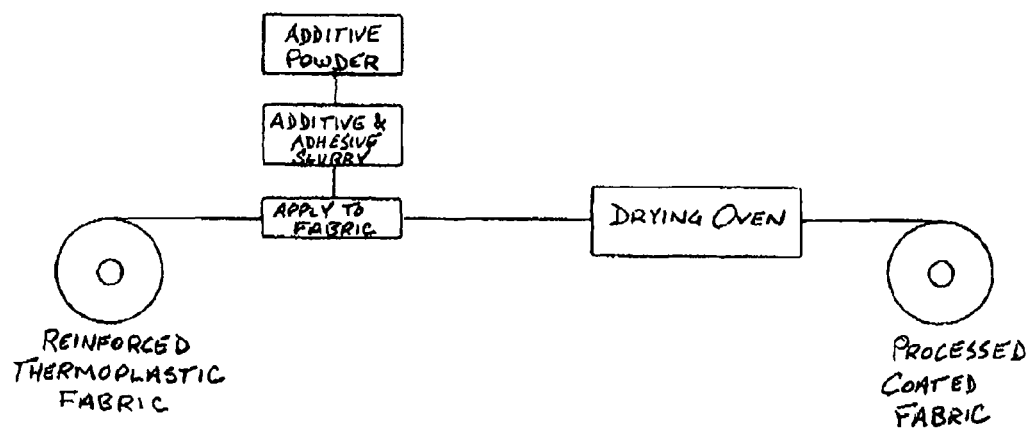

As shown in FIG. 14, a roll of commingled woven, or layered, glass fiber (or carbon or arimide fiber) and thermoplastic polymer is unwound and moving to the right. Examples of such substrate material are TWINTEX® products or products of Polystrand, Inc. The substrate may comprise any orientation, such as 0/90 or 45/45. Additive (flame retardant) powder is preferably mixed with a water-based adhesive slurry and applied to the fabric. The coated fabric is moved through an oven whereupon it is dried. The coated fabric is preferably then re-wound onto a processed roll. The coated fabric may further optionally be heat consolidated alone or with additional glass/thermoplastic layers (not shown).

Figure 15:
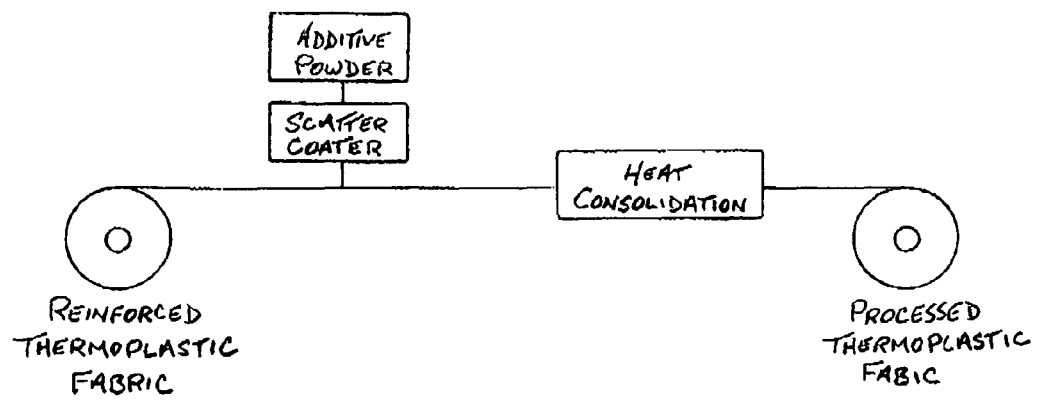

As shown in FIG. 15, a roll of commingled woven, or layered, glass fiber (or carbon or arimide fiber) and thermoplastic polymer is unwound and moving to the right. Additive (flame retardant) powder is deposed by a scatter coater onto the glass/thermoplastic substrate. The coated substrate is preferably further processed by heat consolidation (heat and pressure) and then cooled. The now solid substrate, which incorporates a fire retardant surface, is preferably then rewound into a processed roll.

Depending on the substrate reinforcement and composition, preferably approximately 10 to approximately 40 grams/sq. ft., and more preferably approximately 28 grams/sq. ft., of additive powder is applied to the substrate.

EXAMPLE 1

A dry fire retarding additive powder was produced by uniformly mixing constituents that when exposed to open flame or high radiant heat will provide a catalyst; a carbonific; a blowing agent; an inorganic binder; and ceramic. The powder was placed into a scatter coater, which uniformly applies a desired quantity of dry powder to a substrate which moves under the coater horizontally at a fixed speed. The substrate comprised fibrous thermoplastic polypropylene and glass fibers that have been commingled and woven into a box weave fabric (TWINTEX®) weighing 22 ounces per square yard. The substrate was scatter coated with approximately 20 grams/square foot of additive powder and moved horizontally at approximately 10 feet/minute into a heat consolidator. The heat consolidator comprises three sections: a heating section, a pressure section that employs rollers and can apply up to hundreds of psi, and a cooling section that uses chilled water. The heat consolidator pre-heat the substrate to 400° F., applied 50 psi pressure, and then cooled the substrate using chilled water to less than 150° F., consolidating the substrate into a solid laminate sheet which was then wound into a processed roll.

EXAMPLE 2

Standard testing methods and protocols are used by many authorities to determine fire hazards and surface burning characteristics of building materials, e.g., ASTM E-84 Standard Test Method for Surface Burning Characteristics of Building Materials (example). It is accepted that test results with higher values for flame spread and smoke obscuration are indicative of a greater fire hazard and potential dangerous smoke. Comparative results for the ASTM protocol are listed in Table A.

TABLE A

| Property | Invention | Typical Prior Art |
| --- | --- | --- |
| Flame Spread Ratio | 23.3 | 25.0 |
| Smoke Obscuration | 351 | 980+ |
| Toxicity | None | High |
| ASTM E-84 Classification | 1/A | 1/None |

The tested specimen was a glass fiber reinforced, iso-phthalic polyester pultruded flat laminate that contained the fire and smoke suppressing surface. During the pultrusion manufacturing process, the reinforcement raw materials, e.g., glass rovings and glass mats, were saturated, e.g., wet-out, with the polyester resin composition. After this procedure, this combination was wrapped in the fire and smoke suppressing transport media and subsequently forced through a die at a temperature of 325° F. and pressure of approximately 82 psi. The polyester resin proceeded through an initiated free-radical reaction that chemically and mechanically bonded the entire composite assembly within a single thermoset matrix with the fire and smoke suppressing medium bound as the surface. The propensity of the fully formed part to combust, generate toxic smoke, and transmit heat when exposed to an open flame or excessive heat is significantly reduced.

As seen in Table A, the flame spread ratio is as good or better and smoke obscuration for the test material of the present invention is reduced to about ⅓ of that of typical prior art result. This is a significant reduction. More surprising and important, low quantities of toxic by-products are produced by the invented material, as illustrated in the amount of the registered smoke obscuration.

Smoke obscuration measurement by the ASTM E-84 protocol is based upon the attenuation, e.g., change in the concentration, of a white light beam by smoke accumulating in a chamber. Results are derived from measuring optical density as absorbance within the chamber. The photometric scale used to measure smoke by this method is similar to the optical density scale for human vision. Hence, obscuration can result from such combustion byproduct species as particulate matter, e.g. acrid soot, or gaseous vapor, e.g. water.

As particulate smoke matter generated by pyrolyzing brominated polymers is biologically toxic, as opposed to water vapor, many regulators measure the total quantity of these toxic constituents by ASTM E-1354, e.g., Cone calorimetry. This apparatus uses red laser spectrophotometry to measure the specific mass of particulate smoke generated during the combustion of a sample specimen in comparison to the total mass loss of the test specimen as shown in Table B.

TABLE B

| Property | Present Invention | Typical Prior Art |
| --- | --- | --- |
| Initial Mass | 40.6 grams | 40.6 grams |
| Final Mass | 23.6 grams | 26.2 grams |
| Smoke Obscuration: | | |
| Ave. Smoke Yield (g/g) | .057 | .106 |
| Total Smoke Release (g) | 13.979 | 26.130 |

As seen from Table B, the release of particulate smoke from a specimen employing the invented material is about half of that of typical prior art results obtained from the identical unprotected brominated substrate alone.

The ASTM E-84 smoke obscuration results can be assessed in conjunction with the ASTM E-1354 total smoke release results. Tested typical prior art specimens are compared with specimens employing the current invention. The reduction in toxic smoke generation is dramatic. The corrected value of E-84 smoke obscuration, excluding the water vapor, is reduced from a smoke index value of 350 to about 187. The particulate smoke is about 38% of the typical prior art compound. These are surprising and unexpected results.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding applications, are hereby incorporated by reference.

What is claimed is:

1. A method of manufacturing a fire resistant structure, the method comprising the steps of:
   disposing a fire resistant powder on a fabric, the fabric having a structure sufficiently open or porous to enable permeability of a polymer fluid;
   wetting or saturating the fabric with a polymer resin; and
   encapsulating the fabric within and at the surface of a resin-reinforced structure.

2. The method of claim 1 wherein the resin-reinforced structure is selected from the group consisting of a polymer pultrusion, a reinforced thermoplastic, and a reinforced thermoset.

3. The method of claim 1 further comprising the step of mixing the powder with a hot melt adhesive prior to the disposing step.

4. The method of claim 1 further comprising the step of disposing hot melt adhesive on the substrate.

5. A method of manufacturing a fire resistant structure, the method comprising the steps of:
   mixing a fire resistant powder with an adhesive to form a slurry;
   depositing the slurry on a fabric;
   drying the deposited slurry; and
   encapsulating the fabric within and at the surface of a resin-reinforced structure.

6. The method of claim 5 wherein the resin-reinforced structure is selected from the group consisting of a polymer pultrusion, a reinforced thermoplastic, and a reinforced thermoset.

7. The method of claim 5 wherein the slurry is deposited substantially on the surface of the fabric.

\* \* \* \* \*